United States Patent
Capelle

Patent Number: 5,141,426
Date of Patent: Aug. 25, 1992

[54] DEGASSING EXTRUDER

[75] Inventor: Gerd Capelle, Langenhagen, Fed. Rep. of Germany

[73] Assignee: Hermann Berstorff Maschinenbau GmbH, Hanover, Fed. Rep. of Germany

[21] Appl. No.: 693,224

[22] Filed: Apr. 29, 1991

[30] Foreign Application Priority Data

Dec. 14, 1990 [DE] Fed. Rep. of Germany ....... 4039942

[51] Int. Cl.⁵ ............................ B01F 7/00; B29C 47/00
[52] U.S. Cl. ........................................ 425/203; 366/80; 366/88; 366/89; 366/90; 425/205; 425/208; 425/376.1; 425/382.4
[58] Field of Search ...................... 366/80, 88, 89, 90; 425/135, 145, 146, 169, 170, 203, 205, 207, 208, 209, 376.1, 382.4

[56] References Cited

U.S. PATENT DOCUMENTS

| | | | |
|---|---|---|---|
| 3,347,528 | 10/1967 | List et al. | 366/80 |
| 3,367,635 | 2/1968 | Gresch | 425/203 |
| 3,737,151 | 6/1973 | Schaeffer et al. | 366/89 |
| 4,094,942 | 6/1978 | Nakai et al. | 425/203 |
| 4,423,960 | 1/1984 | Anders | 366/89 |
| 4,538,917 | 9/1985 | Harms | 366/90 |
| 4,573,799 | 3/1986 | Anders | 425/203 |
| 4,652,138 | 3/1987 | Inoue et al. | 366/90 |
| 4,900,494 | 2/1990 | Wobbe | 366/89 |

Primary Examiner—Jay H. Woo
Assistant Examiner—Scott Bushey
Attorney, Agent, or Firm—Foley & Lardner

[57] ABSTRACT

A single-screw degassing extruder for thermoplastic plastics materials and rubber is provided, wherein the pin-barrel and transfer sections, which are known per se and have only been used individually hitherto, are jointly used in one extruder. Throttle pins, which are disposed in the transfer section in the region of the greatest housing thread volume, permit universal use of the extruder in respect of the extruded material or combinations of extruded material and stripping agent, since the mixing efficiency of the extruder and the pressure of the extruded material upstream of a degassing opening in the extruder are thereby advantageously controllable.

9 Claims, 1 Drawing Sheet

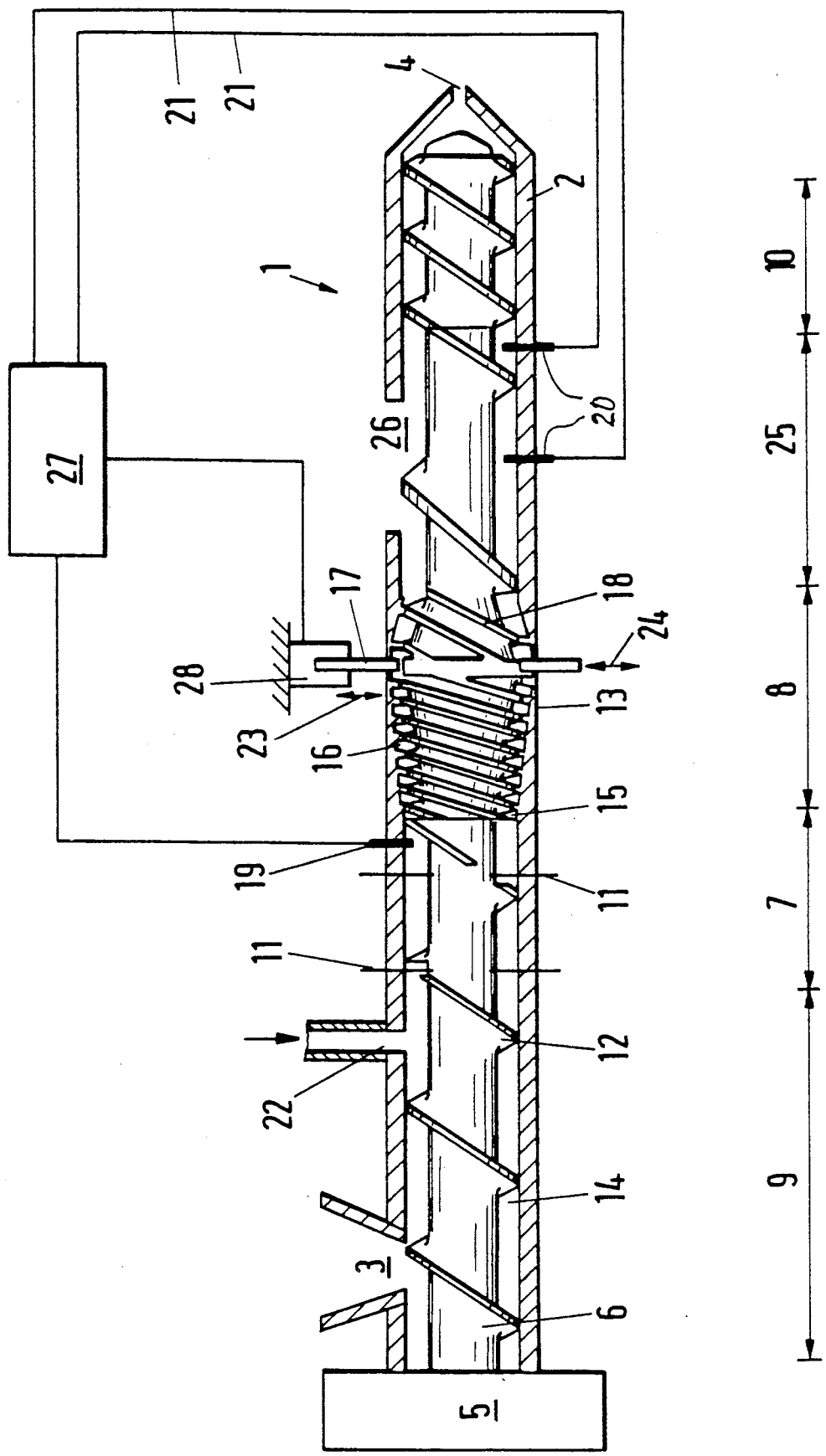

DEGASSING EXTRUDER

BACKGROUND OF THE INVENTION AND PRIOR ART

For the production of thermoplastic plastics materials, it is often necessary to remove residual monomers from the starting plastics material. If, for example, a packaging film for foodstuffs is to be extruded from polystyrene, the proportion of residual monomers, which are harmful to health, may not exceed a predetermined limit value for reasons stipulated in regulations governing foodstuffs and, in consequence, for medical reasons. Since the polystyrene, which is usually to be fed into an extruder, has a proportion of up to 100,000 ppm monomeric styrene, a highly effective degassing arrangement is necessary in order to be able to achieve, in the product, the limit value for residual monomers, which is lower by approximately two powers of ten.

For the degassing of such plastics materials, U.S. Pat. No. 4,094,942 discloses a single-screw extruder for degassing thermoplastic plastics material. In this extruder, in a portion disposed downstream of the feed section, the extruder screw has two pressure restrictors, which are spaced from a screw section producing a mixing effect. Downstream of the first pressure restrictor, the extruder has an injection opening for a stripping agent, which is injectable into the extruded material and is miscible with the molten mass of plastics material in the extruder. In a degassing section disposed downstream of the mixing section, this stripping agent (generally water) then ensures that the molten mass foams-up in the event of a pressure reduction. The increase in size of the free surface of the molten mass, caused by the foam bubbles, effects a degassing of the molten mass which is sufficient for wide ranges of application.

It is additionally known from U.S. Pat. No. 3,613,160 to provide extruders with throttle components, whereby the conveyance of extruded material in the extruder may be variably controlled externally. For this purpose, according to this publication, a substantially cylindrical component is disposed on the screw shaft of the extruder screw, said component rotating jointly with the screw and completely blocking the processing chamber downstream. In the region of this cylindrical component, two throttle pins each extend from externally through the extruder housing radially into an axially oriented overflow conduit, which is incorporated into the internal wall of the extruder housing.

When the throttle pins are retracted, a portion of the extruded material situated upstream of the cylindrical component may pass through these conduits to the downstream section of the extruder. This flow of extruded material can be controlled by the insertion of the throttle pins into these overflow conduits to different depths.

The proportions of residual monomers in the product, which are achievable with such single-screw extruders, however, are not sufficient for many fields of application, and more especially they are not sufficient when the plastics material products come into direct contact, for example, with foodstuffs.

In addition, European Patent Specification No. 0 102 400 belonging to the assignee of the present application discloses that, when degassing rubber mixtures, there are problems in maintaining as pressureless a conveyance as possible of the extruded material in the degassing section, when the mixing section of the extruder operates at a high rate of conveyance and, in addition, the extrusion tool disposed downstream of the extruder produces a high tool counterpressure.

To solve this problem, this publication proposes to increase the diameter of the extruder in the degassing and discharge sections by 10 to 30% compared with the diameter in the mixing section. This arrangement makes available considerably more volume in the processing chamber of the extruder for the extruded material, with the result that, even at a high rate of conveyance and with considerable tool counterpressure, degassing may be effected in an optimum manner.

Nevertheless, however, this extruder is disadvantageous, in that it is only utilizable for a comparatively narrow range of rubber mixtures and tool counterpressures. In the event of the occurrence of greater deviations from the starting value of the extruder, it is necessary to tolerate a poorer degassing performance and/or less output. This is remedied only by adapting the extruder screw to the other above-mentioned extrusion conditions, which may differ considerably.

SUMMARY OF THE INVENTION

In consequence, the basic object of the invention was to provide a single-screw extruder for the more effective degassing of thermoplastic plastics materials and rubber mixtures. In such case, the degassing section of the extruder should be constructed so that the optimum conditions for mixing the stripping agent, or respectively the optimum degassing conditions, are adjustable without great expenditure in dependence upon the specific properties of the extruder and of the tool counterpressure.

With regard to the degassing of plastics material, the basic finding of the invention is that optimum degassing of the molten mass is only possible when the stripping agent has been completely and homogeneously mixed in the molten mass. Only in this manner can the molten mass be intensely degassed in the degassing section of the extruder with as great a formation of foam bubbles as possible, so that the limit values according to regulations governing foodstuffs may be observed.

In order to be able to achieve this complete mixing of the stripping agent with the molten mass, it is necessary to increase the pressure of the molten mass to a value which lies above the specific evaporation pressure of the stripping agent used. If this is achieved, the stripping agent and the molten mass can easily be mixed together in the fluid phase and subsequently expanded beneath the degassing opening of the extruder with a considerable formation of foam bubbles. The molten mass is almost fully degassed in this manner.

In order to be able to degas selectively various plastics materials with different stripping agents using the same extruder, a pressure-controlling facility is necessary for the extruded material in the mixing section of the extruder. In such case, it is immaterial whether the stripping agent is injected into the extruder in liquid form or is already supplied in solid or liquid form to the extruder together with the plastics material.

This finding has been converted to a single-screw degassing extruder, wherein a feed section and a pin-barrel mixing section are disposed downstream of an inlet opening for receiving the extruded material. In an advantageous embodiment, the injection location for the stripping agent is situated at the beginning of this pin-barrel section, whereby a first mixing of the stripping agent is already achievable in this section with the extruder pins, which protrude into the processing chamber.

Disposed downstream of the pin-barrel section there is a transfer section, which is substantially characterised in that both the extruder screw and the internal wall of the extruder housing are provided with grooves and flights over a predetermined length, the thread depth of the extruder screw, when viewed in the longitudinal direction of the extruder housing, decreasing to zero and subsequently increasing again at the same rate as the thread depth of the grooves in the housing respectively increases and decreases again. As a result of this configuration for the extruder screw and housing, the extruded material can be exchanged fully between the screw grooves and the housing grooves when the mixing section rotates, thereby producing a good mixing effect.

Because of the provision of adjustable throttle pins, which protrude radially into the portion of the transfer section of the extruder housing where the housing threads substantially have their greatest thread volume, the proposed extruder can be adjusted for processing various plastics materials. In consequence, with the ability to vary the depth of penetration of the throttle pins into the housing threads and into the processing chamber of the extruder, it is possible for the mixing efficiency of the extruder and the pressure of the molten mass of extruded material to be preselected as desired and with regard to the mixture.

In addition to being used as a plastics material degassing extruder, the use of the present invention as a rubber degassing extruder is also extremely advantageous. In such case, the untreated rubber may be provided with its mixture components via openings in the extruder housing, such components being subsequently mixed in the pin-barrel region, which is considerably active in respect of conveyance. By means of the transfer section of the extruder, the rubber mixture is further homogenized, whereby the throttle pins in the housing threads may vary the mixing efficiency, on the one hand, and the rate of conveyance of the extruder, on the other hand. It is thus possible to keep the degree of filling in the degassing section constant in an optimum manner independently of the rubber mixture used and the extrusion tool, which is connected to the output end of the extruder.

In addition, pressure sensors can be positioned at the end of the pin-barrel section and in the pressure increasing outlet sections and/or in the degassing section of the extruder. These sensors are adapted to sense pressures in such areas and convey pressure values to a processing computer which is operably connected to an adjusting means for the throttle pins. The processing computer can thus control the optimum depth to which the throttle pins penetrate the housing threads to compensate for variations in tool counterpressure and in the rate of conveyance of material in the extruder. Thus, the extruder can be rapidly adapted to different extruded materials and tool heads.

BRIEF DESCRIPTION OF THE APPLICATION DRAWING

The invention can be explained with reference to the described embodiments and the accompanying drawing which comprises a longitudinal sectional view through a single-screw degassing extruder 1 having throttle pins in the transfer section.

DETAILED DESCRIPTION OF THE PREFERRED EMBODIMENTS

One extruder screw 6 is disposed internally of the extruder housing 2 and is drivable about its longitudinal axis by a drive unit 5. In the region of its upstream end, the housing 2 has an inlet opening 3 for receiving the material, with the material, which is to be extruded and leaving the extruder, ready plasticized and degassed, through the outlet opening 4.

In the feed section 9, the extruder screw 6 has a screw geometry which is suitable for drawing into the extruder, in a manner known per se, the material which has been supplied through the inlet opening 3 and for plasticizing such material.

An injection opening 22 for a stripping agent or for rubber mixture components is provided downstream of this feed section 9 and upstream of a pin-barrel section 7, although such components may also be introduced into the extruder through the inlet opening 3 in solid or liquid form.

Alternatively, the injection opening 22 may also be disposed downstream of the pin-barrel section 7 upstream of the transfer section 8, which communicates with section 7.

In this embodiment, two or more rows of pins 11 are disposed in the pin-barrel section 7, in a manner known per se, so as to protrude radially through the extruder housing 2 towards the screw axis into the processing chamber 14 of the extruder. The screw flights 12 are interrupted in known manner in the pin plane in this section 7, in order to avoid colliding with the pins 11.

Downstream of the pin-barrel section 7, there is disposed a transfer section 8, wherein the screw 6 and the housing 2 are in the form of a mixing section and wherein, in this embodiment, the angles between the flights 18 of the extruder screw 6 and the flights 13 of the extruder housing 2 are greater than or equal to 105° and do not form any angles with one another which are complementary to 90°.

In addition, the extruder screw and the extruder housing in this transfer section 8 are so adapted that the number of the screw flights and the housing flights remains constant independently of the increasing and decreasing cross-sectional areas of the screw and housing threads in the inlet region and outlet region of the transfer section 8.

In contrast to the screw threads 15, the sleeve threads 16 in the transfer section are not interrupted. Rather, they extend continuously and constantly from the inlet region of the transfer section to its outlet region respectively in a substantially increasing and decreasing helical manner around the longitudinal axis of the extruder.

In the inlet region of the transfer section, which terminates in the region thereof inwardly of the pins 17, the screw core diameter increases from the maximum thread depth to the external diameter, i.e. the thread volume of the screw 6 decreases from the maximum value in the inlet region to zero. The thread volumes of the housing 2 have the reverse tendency. In consequence, the throughput volume which is effective for the extruded material is kept constant in the axial and radial directions of conveyance. Because of these circumstances, there is, of necessity, a one hundred percent exchange of extruded material between the screw threads 15 and the housing threads 16.

In the outlet region of the transfer section downstream of the pins 17, the thread volume of the screw 6 continuously increases, and continuously decreases in the case of the housing threads 16, whereby, in turn, the total thread volume of screw and sleeve for the extruded material is kept constant.

In this embodiment, there is situated at the end of the first portion of the transfer section 8 a throttle means which has throttle pins 17 distributed equiangularly over the periphery and which protrude radially into the uninterrupted housing threads 16, said pins being able to reduce the thread volume in this section from the maximum value to zero.

With these throttle pins 17, which are either manually, mechanically, pneumatically, or hydraulically displaceable externally in the direction of arrows 23, 24 via the adjusting means schematically shown at 28, the mixing effect of the extruder and the pressure of the extruded material may be controlled, as desired, in dependence on the specific properties of the extruded material and on the counterpressure of the tool.

According to this invention, a degassing section 25 is disposed downstream of the transfer section 8. The extruded material, or mixture of extruded material and stripping agent, is expanded in this section 25, with the result that it may largely be discharged with considerable foaming-up of its volatile ingredients.

The extruder screw 6 has a considerably reduced number of threads in the degassing section 25, so that additional space for the expansion of the extruded material is available in a manner known per se.

The substances to be degassed may leave the extruder via a degassing opening 26, which may also communicate with a suction means (not shown).

The final processing section of the extruder 1 is formed by a pressure increasing section 10, in which the screw geometry is so selected that the pressure of the extruded material can be increased to the required tool pressure in known manner.

Pressure sensors can be provided to permit the extruder to be rapidly adapted to different extruded materials and too heads. In the application drawing, a pressure sensor 19 is positioned near the end of the pin-barrel section and extends into the processing chamber 14. Similar pressure sensors 20 are positioned in the processing chamber below the degassing opening and between the threads in the pressure increasing outlet section of the extruder. All of these pressure sensors are connected by lines 21 to a processing computer which is in turn operatively connected to an adjusting means 28 for adjusting the radial protrusion of the throttle pins 17. By this arrangement, pressure conditions measured by the sensors 19 and 20 can be calculated by the computer 27 so that the depth of penetration of the throttle pins can be set to account for variations in the tool counterpressure and in the rate of conveyance of the extruder.

Although the length of the various extruder sections is not critical, for extruders having a length of approximately 10 screw diameters (D), the length of the feed section 9 can be approximately 3 D, the length of the pin-barrel section 7 can be approximately 1.5 to 2 D, the length of the transfer section 8 can be up to 2.5 D, and the length of the pressure increasing outlet section 10 can be substantially 3 D.

I claim:

1. A single screw degassing extruder for thermoplastic materials, comprising:

an elongated extruder housing defining a feed section in which a feed inlet is provided for feeding material to the extruder, and an outlet section for increasing the pressure of the material, said outlet section having a material outlet opening for discharging molten material under pressure from the extruder, an extruder screw having a screw core and a helical flight, said screw being mounted for rotation in said housing about the longitudinal axis of said screw, said housing and said screw core defining therebetween a processing chamber, and means for driving said screw, said housing further defining a pin-barrel section in which at least one row of pins extend radially inwardly of the housing through the processing chamber toward the core of said screw, said helical flight of said screw being interrupted in the regions of said pins so as to accommodate rotation of said screw in such region.

a transfer section defined by said housing longitudinally adjacent said pin-barrel section, said transfer section having an inlet region and an outlet region the helical flight of said screw in said transfer section being constructed so that thread depth of the areas between adjacent flight sections first decreases toward zero and then increases, and wherein said housing in said transfer section is also formed with a helical flight generally aligned with the helical flight of said screw, said helical flight of said housing defining between adjacent flight sections thereof grooves which vary in depth and which are radially aligned with the areas between adjacent flight sections of said screw, the depth of said grooves between adjacent flight sections of said housing first increasing in said inlet region of said transfer section to a maximum thread volume and then decreasing in said outlet region of said transfer section, and being generally inversely proportional to the thread depth between radially adjacent flight sections of said screw, a plurality of radially adjustable throttling pins disposed in the region of maximum thread volume of the housing threads and protrudable through the housing into the housing threads and processing chamber, and means for radially adjusting the protrusion depth of said throttle pins, and a degassing section disposed downstream of said transfer section, said extruder in said degassing section having a reduced number of threads, and said extruder housing in said degassing section being formed with a degassing opening through which degassed constituents are discharged.

2. An extruder according to claim 1, wherein said pin-barrel section is disposed upstream of said transfer section.

3. An extruder according to claim 1, further including an injection opening for a stripping agent provided in said extruder housing upstream of said transfer section and said pin-barrel section.

4. An extruder according to claim 3, wherein the length of said extruder is approximately 10 screw diameters (D), the length of the feed section is 3 D, the length of the pin-barrel section is 1.5 to 2 D, the length of the transfer section is up to 2.5 D, and the length of the pressure increasing outlet section is substantially 3 D.

5. An extruder according to claim 1, wherein two to five rows of pins are disposed in the pin-barrel section.

6. An extruder according to claim 1, wherein said transfer section is so constructed that angles between flights of the extruder screw and flights of the extruder housing are greater than or equal to 105, and wherein the number of screw flights and housing flights in the inlet and outlet regions of the transfer section are constant independently of the cross-sectional area of the housing and screw threads.

7. An extruder according to claim 1, wherein at least one throttle pin per housing thread is provided, and in that the adjustable throttle pins are moveable by said adjusting means through the depth of the housing threads to a position closely above a core surface of the screw.

8. An extruder according to claim 7, wherein said throttle pins are radially adjustable by mechanically, pneumatically or hydraulically actuatable adjusting means.

9. An extruder according to claim 1, further including pressure sensors positioned adjacent said pin-barrel section and in the pressure increasing outlet section, said sensors protruding into the processing chamber, and being connected to a computer which in turn is operatively connected to said adjusting means for said throttle pins to vary the radial position of said throttle pins depending upon operating parameters.

* * * * *